(12) United States Patent
Wolcott (10) Patent No.: US 6,931,232 B1
(45) Date of Patent: Aug. 16, 2005

(54) BI-STATIC COMMUNICATION RELAY ARCHITECTURE

(75) Inventor: James L. Wolcott, La Mirada, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 1826 days.

(21) Appl. No.: 08/886,329

(22) Filed: Jul. 1, 1997

(51) Int. Cl.$^7$ .............................................. H04B 7/185
(52) U.S. Cl. ..................................... 455/12.1; 342/353
(58) Field of Search ........................... 455/12.1, 13.1, 455/13.2, 427, 428, 1, 63; 370/316, 317; 342/352, 353, 357.01, 357.16, 367, 357.1

(56) References Cited

U.S. PATENT DOCUMENTS

| | | | |
|---|---|---|---|
| 3,452,356 A | * | 6/1969 | Stoney ........................ 455/13.1 |
| 4,375,697 A | | 3/1983 | Visher |
| 4,455,651 A | | 6/1984 | Baran |
| 4,599,619 A | | 7/1986 | Keigler et al. |
| 4,630,058 A | | 12/1986 | Brown |
| 4,758,840 A | * | 7/1988 | Dardenne et al. ........... 342/359 |
| 4,841,303 A | * | 6/1989 | Anderson .................... 342/359 |
| 4,872,015 A | | 10/1989 | Rosen |
| 4,901,307 A | | 2/1990 | Gilhousen et al. |
| 5,008,952 A | | 4/1991 | Davis et al. |
| 5,019,833 A | | 5/1991 | Nonaka |
| 5,142,400 A | * | 8/1992 | Solinsky ..................... 359/159 |
| 5,178,805 A | * | 1/1993 | Yokota ...................... 455/12.1 |
| 5,287,541 A | | 2/1994 | Davis et al. |
| 5,303,286 A | | 4/1994 | Wiedeman |
| 5,313,215 A | | 5/1994 | Walker et al. |
| 5,340,056 A | * | 8/1994 | Guelman et al. ........... 244/3.16 |
| 5,382,957 A | | 1/1995 | Blume |
| 5,398,035 A | * | 3/1995 | Densmore et al. .......... 343/713 |
| 5,433,726 A | | 7/1995 | Horstein et al. |
| 5,448,623 A | | 9/1995 | Wiedeman et al. |
| 5,458,041 A | | 10/1995 | Sun et al. |
| 5,471,641 A | | 11/1995 | Dosiere et al. |
| 5,518,205 A | * | 5/1996 | Wurst et al. ................... 244/58 |
| 5,526,404 A | | 6/1996 | Wiedeman et al. |
| 5,528,247 A | | 6/1996 | Nonami |
| 5,530,909 A | | 6/1996 | Simon et al. |
| 5,535,430 A | * | 7/1996 | Aoki et al. .................. 455/552 |
| 5,548,801 A | | 8/1996 | Araki et al. |
| 5,551,624 A | | 9/1996 | Horstein et al. |
| 5,592,481 A | | 1/1997 | Wiedeman et al. |
| 5,594,454 A | * | 1/1997 | Devereux et al. ........... 342/352 |
| 5,594,780 A | | 1/1997 | Wiedeman et al. |
| 5,619,209 A | | 4/1997 | Horstein et al. |
| 5,625,363 A | * | 4/1997 | Spilker ....................... 455/12.1 |
| 5,634,190 A | | 5/1997 | Wiedeman |
| D382,851 S | * | 8/1997 | Knutson et al. ........... D12/333 |
| 5,722,042 A | * | 2/1998 | Kimura et al. ............. 455/13.1 |
| 5,748,138 A | * | 5/1998 | Telle et al. .................. 342/45 |
| 5,771,019 A | * | 6/1998 | Wachs et al. ............... 342/442 |
| 5,787,649 A | * | 8/1998 | Popowych et al. ............ 52/40 |
| 5,839,053 A | * | 11/1998 | Bosch et al. ............... 455/13.1 |

* cited by examiner

Primary Examiner—Gregory C. Issing
(74) Attorney, Agent, or Firm—Katten Muchin Rosenman LLP; John S. Paniaguas (57) ABSTRACT

A bi-static communication relay includes a receiver and transmitter carried by different platforms. In particular, the transmitter may be carried by a geosynchronous satellite forming a broadcast platform. The receiver is hidden on a low observable platform, such as an airborne or even a ground based platform forming a hidden platform. The location of the low observable platform is known only to legitimate users of the system. Communications between the hidden platform and broadcast platform are by way of a secure narrow beam uplink to reduce the risk of jamming. Physical separation of the receiver and transmitter essentially defeats the jammer's high power amplifier advantage since the receiver platform is hidden from the jammer. This forces the jammer to use a low gain antenna in order to cover as much sky as possible. System users, on the other hand, can use the gain advantage of a directional antenna, since they alone have knowledge of the hidden platform's location.

27 Claims, 5 Drawing Sheets

BI-STATIC COMMUNICATION RELAY ARCHITECTURE

This invention was made with Government support under Contract No. F04701-96-C-0015 awarded by the Department of Defense. The Government has certain rights in this invention.

BACKGROUND OF THE INVENTION

1. Field of the Invention

The present invention relates to a satellite communication (SATCOM) system and more particularly to a bi-static SATCOM relay for use with relatively low power earth stations, in which the receiver is carried by a separate hidden platform and interconnected with a transmitter platform by way of a secure narrow beam communications link.

2. Description of the Prior Art

Satellite communication (SATCOM) systems are generally known in the art. Examples of such SATCOM systems are disclosed in U.S. Pat. Nos. 5,433,726; 5,551,624 and 5,619,209, all assigned to the same assignee as the present invention and herein incorporated by reference. Such SATCOM systems are used in various commercial and military applications. For example, U.S. Pat. Nos. 5,433,726 and 5,551,624 relate to SATCOM systems for use with cellular communication systems, while U.S. Pat. No. 5,619,209 relates to a SATCOM system for use with a paging system. In such applications, a constellation of satellites in an earth orbit are used to provide communication links between various earth stations.

Other commercial applications of SATCOM systems are known. For example, "sky phones," available on many commercial aircraft, allow passengers to communicate with terrestrial and cellular telephone systems. In this application, a satellite relay which includes a transmitter and receiver is used to form a communication link between the aircraft during flight and the terrestrial telephone systems.

Such SATCOM systems are also used in military applications. In such applications, satellites are used as relays to provide a communication link between various earth stations. As described in more detail in U.S. Pat. No. 5,528,247, hereby incorporated by reference, such SATCOM systems include a satellite relay 20 (FIG. 1) in an earth orbit which includes a transmitter and a receiver. The SATCOM relay 20 is used to provide a communication link between various earth stations 22 and 24, which may include mobile ground and naval terminals. In such applications, high powered jammers 26 are known to operate within the theater. In such a situation, the jammer 26 has several advantages compared to the earth stations and particularly mobile terminals. For example, the jammer 26 may have access to a relatively powerful generator which easily supports multi-kilowatt class transmitter amplifiers, such as traveling wave tube amplifiers (TWTAs), which are readily available in most uplink bands. In contrast, a mobile terminal is often battery operated which limits the amplifier power to about 10 watts or less. In addition, the jammer 26 can utilize a relatively large parabolic reflector or phased array antenna while the mobile user is normally limited to a much smaller reflector or an omni-directional antenna. As such, the jammers' effective isotropic radiated power (EIRP) exceeds the users EIRP by a substantial margin, such as 70 dB or more.

The jammers are stationary while the mobile terminals need to communicate on the move. As such, a high gain narrow beam jammer antenna can be set up and steered to the satellite receiver with great precision while the mobile terminal is forced to either trade away antenna peak gain for broader beam width in order to offset uncompensated dynamic pointing error or implement an antenna control system capable of tracking its motion.

Various techniques are known to have been tried to overcome the disadvantages of mobile terminals in such applications, such as spread spectrum processing gain and spacecraft receive antenna spatial discrimination. Unfortunately, both techniques provide relatively limited results. For example, it may be desirable for single mobile users with data rates up to 50 Mbps to operate in X-band with Defense Satellite Communication System (DSCS) waveforms. As such, less than 10 would fit within the 500 MHz SHF band allocation. With frequency hopping for anti-jamming protection, the maximum processing gain available to any user would be limited to about 10 dB. Even though more spectrally efficient waveforms provide higher gain at the expense of terminal complexity or higher terminal power, increasing the terminal EIRP also increases the user's vulnerability to detection and location by an adversary.

Alternatively, while spatial discrimination on the order 40 dB can be supported with current spacecraft antenna technology, the stand off distance, set by the SATCOM relay antenna at geosynchronous altitude, will not allow the earth terminal to be closer than a few hundred miles from the jammer 26, even when the user is near the sub-satellite point on the earth. The level of anti-jamming protection provided by spacecraft antenna beam shaping diminishes as the standoff distance decreases and as the user moves closer to the edge of the satellite's footprint. Antenna isolation becomes more challenging to maintain as the number of jammers increase within the antenna field of view.

SUMMARY OF THE INVENTION

It is an object of the present invention to solve various problems in the prior art.

It is yet another object of the present invention to provide a satellite communication (SATCOM) relay for a communication system which overcomes many of the disadvantages of known systems.

Briefly, the present invention relates to a bi-static communication relay in which the receiver and transmitter are carried by different platforms. In particular, the transmitter may be carried by a geosynchronous satellite forming a broadcast platform. The receiver is carried by a low observable platform, such as an airborne low observable platform, or even a low observable ground based platform forming a hidden platform. Communications between the hidden platform and broadcast platform are by way of a secure narrow beam uplink to reduce the risk of jamming. Physical separation of the receiver and transmitter essentially defeats the jammer's power advantage since the adversary will not know the location of the receiver and thus will not be able to point the jammer's antenna at it.

DESCRIPTION OF THE DRAWINGS

These and other objects of the present invention will be readily understood with reference to the following specification and attached drawing.

DETAILED DESCRIPTION

Figure 2:
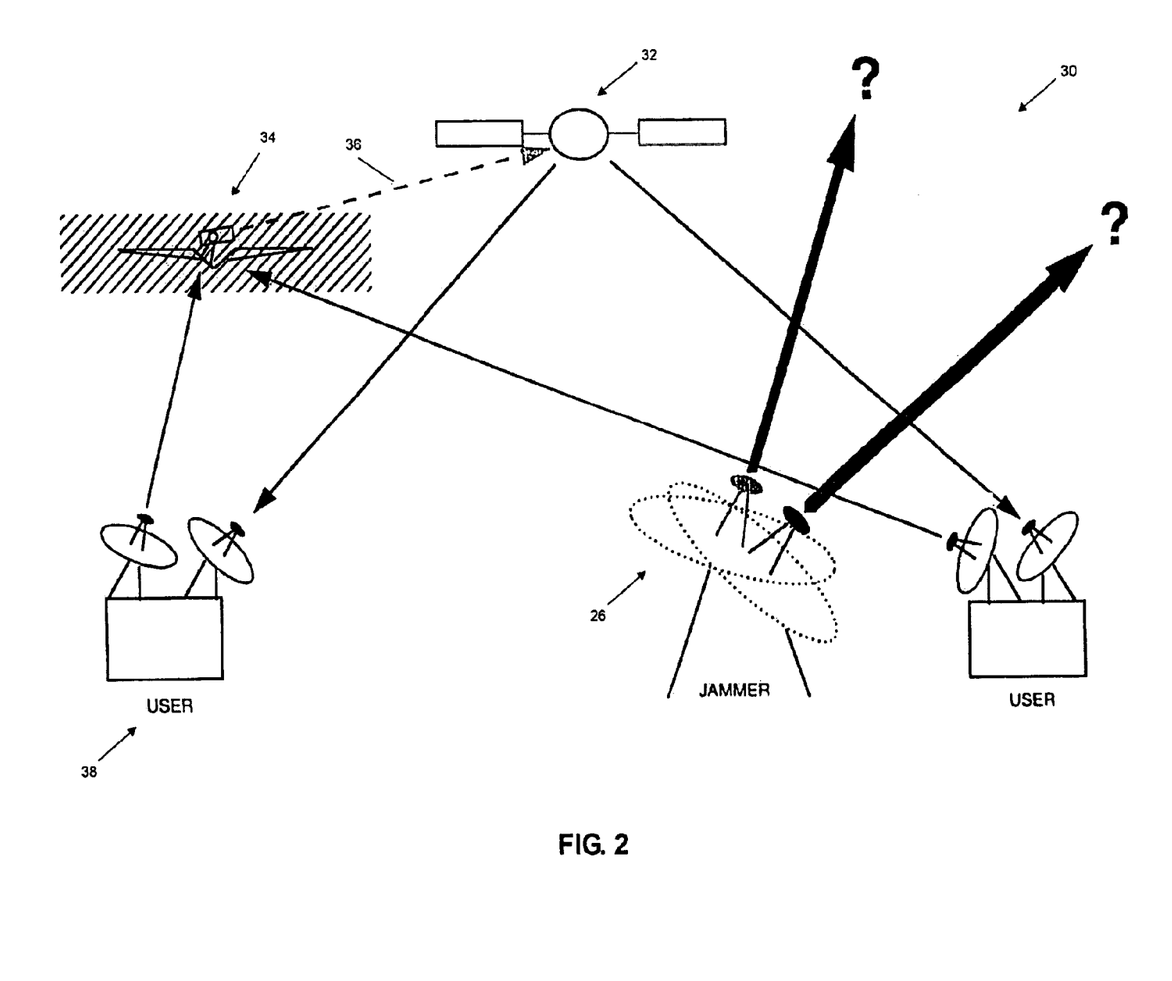
FIG. 2 is a block diagram of a bi-static communication relay configuration in accordance with the present invention.

The satellite communication (SATCOM) system in accordance with the present invention is illustrated in FIG. 2 and generally identified with reference numeral 30. The SATCOM system 30 is configured as a bi-static communication relay which includes a broadcast platform 32 and a hidden platform 34 for enabling communication among various user stations or protected terminals 38, which may be mobile terminals. The hidden platform 34, indicated in FIG. 2 behind the cross hatched lines, may be a low observable airborne platform, such as a DarkStar unmanned aerial vehicle (UAV), as manufactured by Lockheed-Martin or a hidden earth based platform. Communication between the hidden platform 34 and the broadcast platform 32 is by way of a secure narrow beam uplink 36 which may be an optical or RF link at a wavelength with relatively high atmospheric absorption loss. Position and velocity velocity information for the hidden platform 34 is encrypted and broadcast to the protected terminals 38 by the broadcast platform 32 to enable the protected terminals to properly point their antennas to the hidden platform 34.

Figure 1:
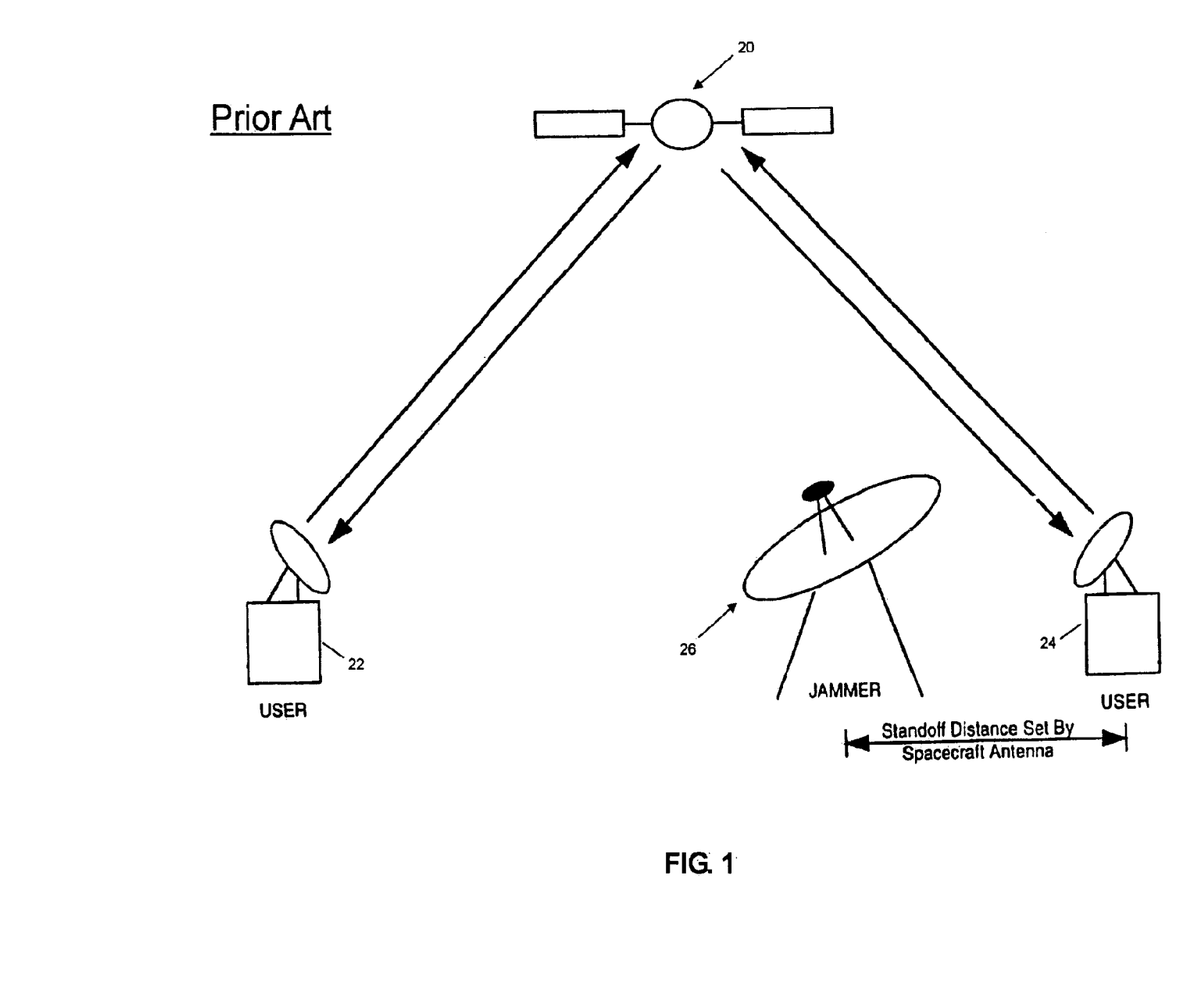
FIG. 1 is a schematic diagram of a conventional mobile satellite communication (SATCOM) system illustrating an in-theater jammer.

With such a configuration, a jammer's antenna size advantage will be relatively useless since the relay receiver location is unknown. As such, an adversary will not know where to point the jammer antenna. Targeting the broadcast platform 32 will be futile since the receiver is mounted on the hidden platform 34. With such a configuration, the jammer 26 will need to cover as much area as possible at all times, restricting the antenna gain of the jammer to roughly 3 dBi, about 60 dB less gain than possible against a conventional SATCOM relay as illustrated in FIG. 1. Since the position and velocity information for the hidden platform 34 is encrypted before being broadcast throughout the theater by the broadcast platform 32, only legitimate protected terminals 38 with complementary decryption capability will able to gain access to the hidden platform 34. Unlike the jammer 26, the protected terminals 38 will be able to utilize highly directive antennas at a higher antenna gain relative to the jammer 26 which, as discussed above, because of the unknown position of the hidden platform 34, will need to utilize an antenna with broad coverage and consequently low gain.

The configuration of the bi-static communications relay system 30 in accordance with the present invention also offers other protection against jamming. In particular, the uplink 36 between the hidden platform 34 and the broadcast platform 32 may be implemented by a very narrow beam telescope or low sidelobe antenna at a wavelength with relatively high absorption loss to further minimize the risk of detection by a jammer. In addition, the geometry of such configuration changes relatively fast for a jammer 26 to stay on the same line of sight as the hidden platform 34 for very long. Since the hidden platform 34 may be a low observable platform, the jammer may not even know it is in the line of sight from the broadcast platform 32 to the hidden platform 34.

The configuration of the bi-static relay system 30 in accordance with the present invention provides other advantages. In particular, by utilizing a low observable platform, such as a DarkStar UAV for the hidden platform 34, an earth station protected terminal 38 can be about a thousand times closer to the UAV than to a satellite in geosynchronous orbit which enables uplink transmission of wideband data with relatively low transmitter power, enhancing the performance as well as the portability of the mobile user.

Another advantage of the bi-static relay 30 is the complete decoupling of the standoff distance relative to the spaceborne antenna size. In known systems, the satellites must utilize antennas with relatively large apertures in order to improve the standoff distance. Spacecraft weight and volume limitations restrict the practical size of these antennas and therefore limit the stand-off distance between the jammer and the legitimate user. In the configuration in accordance with the present invention as illustrated in FIG. 2, the receive antenna is located at the hidden platform 34. As a result, the satellite broadcast platform 32 has nothing to do with the standoff distance. As such, user/jammer separation distances as near as a few miles are possible, which can be useful in integrated battlespace environments where the forces move so swiftly that no firm battle lines are ever established.

Figure 3:
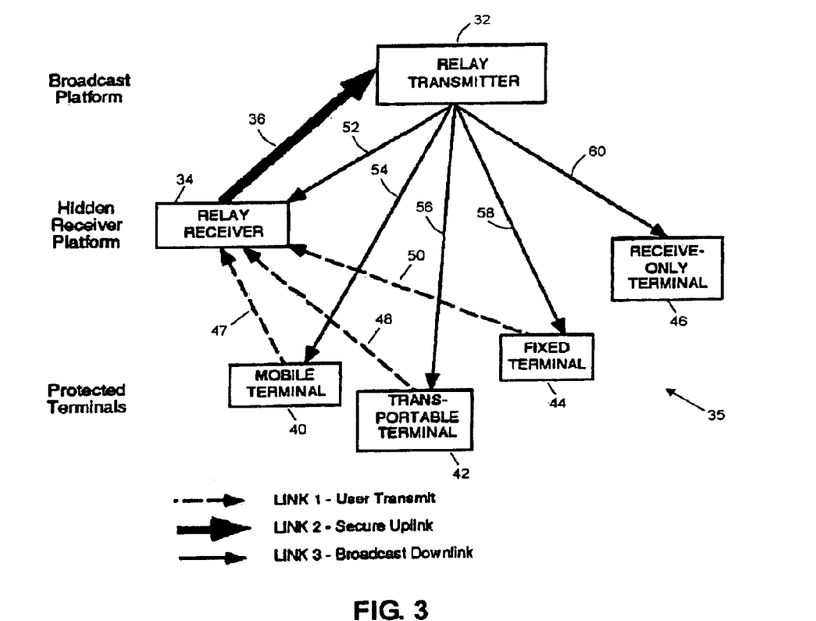
FIG. 3 is a block diagram illustrating the data links between the various terminals in the bi-static SATCOM relay in accordance with the present invention.

A data link diagram illustrating the various data links between the broadcast platform 32, hidden receiver platform 34 and the protected terminals 38 is illustrated in FIG. 3. As shown, the protected terminals 38, can be conventional mobile terminals 40, transportable terminals 42, fixed terminals 44, and receive only terminals 46. Communication links between the protected terminals 38 and the hidden receiver platform 34 are indicated by dashed lines 47, 48 and 50. As indicated previously, the link between the hidden platform 34 and the broadcast platform 32 is provided by a secure narrow beam uplink, and indicated by the arrow 36. Data transmitted by the various terminals 40, 42 and 44 is uplinked to the hidden platform 34, which, in turn, is transmitted to the broadcast platform 32. The broadcast platform 32 downlinks the data to the various protected terminals 40, 42, 44 and 46 by way of the communication links illustrated by the solid lines 54, 56, 58 and 60. For the receive and transmit terminals 40, 42 and 44, the broadcast platform 32 also downlinks the position and velocity information of the hidden receiver platform 34 to the protected terminals 40, 42 and 44. Since the terminal 46 is a receive only terminal, there is no need to provide the position and velocity data of the hidden receiver platform 34 to the receiver terminal 46. As will be discussed in more detail below, a downlink 52 is provided between the broadcast platform 32 and the hidden platform 34 to assist in steering of the hidden platform transmit antenna toward the broadcast platform receive antenna.

Figure 4:
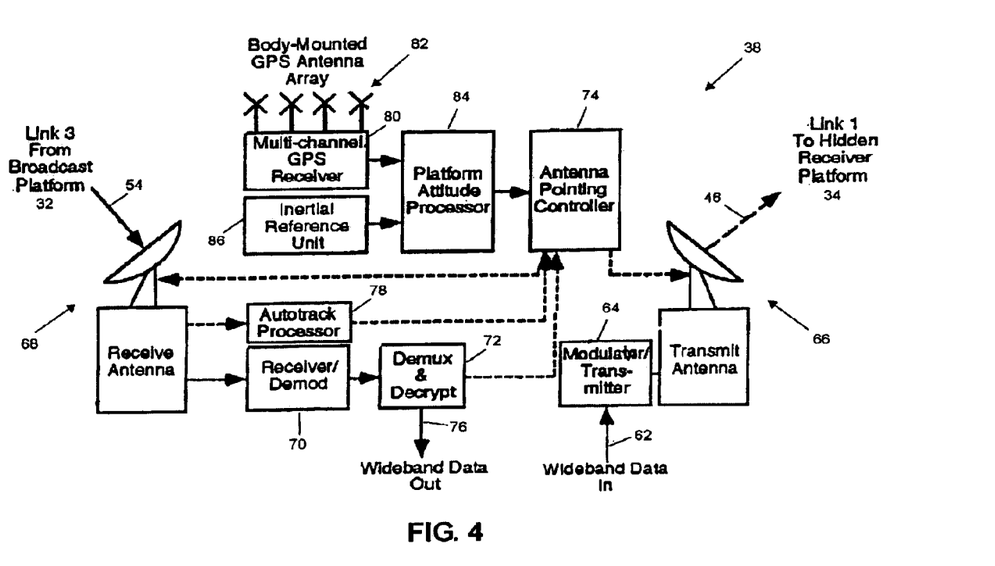
FIG. 4 is a block diagram of the earth station terminal for use with the bi-static SATCOM relay in accordance with the present invention.

FIG. 4 is a block diagram of a protected terminal 38 that is adapted to be used with the bi-static communication relay 30 in accordance with the present invention. It should be noted that the configuration of the protected terminal 38 is exemplary, and that virtually any conventional terminal is suitable as a basis for use with the invention, when augmented with the special features described below. Referring to FIG. 4, the protected terminal 38 is connected to a source of wideband input data, for example, camera, imagery, terrestrial telephone data, etc. as generally indicated by the arrow 62. The wideband input data 62 is applied to a conventional modulator/transmitter 64 which modulates by known modulation methods the wideband input data in order to transmit it to the hidden receiver platform 34 by way of a transmit antenna, generally identified with the reference numeral 66. The transmit antenna 66 may be, for example, a beam steerable antenna, such as a phased array antenna.

The position and velocity of the hidden platform 34 is encrypted and broadcast from the broadcast platform 32 to a receive antenna 68 at the protected terminal 38. The data received at the receive antenna 68 includes the hidden platform's position and velocity data as well as other wideband data. This data is applied to a conventional receiver/demodulator, and, in turn, to a demultiplexer and decrypter 72. The demodulator 70 demodulates the data from the receive antenna 68 and applies it to the demultiplexer/decrypter 72. The decrypted position and velocity data for the hidden platform 34 is applied to a conventional antenna pointing controller 74, which, in turn, is used for beam steering of the transmit antenna 66. The other data from downlink 54, i.e. telephone data, imagery data, etc. which is demodulated by the receiver/demodulator 70 is output at the protected terminal 28 as wideband data, as indicated by the arrow 76.

A conventional autotrack processor 78 may be used for optimizing the pointing of the receive antenna 68 as a function of the received signal strength. In particular, the signal from the receive antenna 68 may be applied to an autotrack processor 78, which, in turn, develops angular error signals and applies them to the antenna pointing controller 74. The antenna pointing controller 74 is used for pointing of the transmit antenna 66 as a function of the position and velocity data for the hidden platform 34 as well as pointing of the receive antenna 68 as a function of the received signal strength.

In order for the transmit antenna 66 to be properly pointed at the hidden platform 34, the coordinate location of the protected terminal 38 must be known. As such, the protected terminal 38 may be provided with a multi-channel global positioning system (GPS) receiver 80. In order to provide the attitude of the protected terminal 38, a body mounted GPS antenna array 82 is utilized. The coordinate location as well as the attitude of the protected terminal 38 is applied to a conventional platform attitude processor 84 which provides an input to the antenna pointing controller 74 in a conventional manner in order to point the transmit antenna 66 at the receive antenna 86 on the hidden receiver platform 34. The antenna pointing controller 74 also utilizes signals from the autotrack processor 78 to point the receive antenna 68 as a function of the signal strength.

Since the protected terminal 38 may indeed be a mobile terminal, an inertial reference unit 86 may be provided to provide attitude data of the mobile terminal 38 during conditions of, for example, outages of the GPS system or temporary disturbances in the position data due to bumps and the like. The inertial reference unit 86 may also include a gyroscope in order to provide attitude data as well.

The transmit and receive antennas 66, 68 may be phased array antennas or parabolic reflector antennas. The transmit antenna 66 is may be a directional antenna with low sidelobes to enable it to focus all of its power at the hidden relay platform and minimize its detectability by an adversary.

Figure 5:
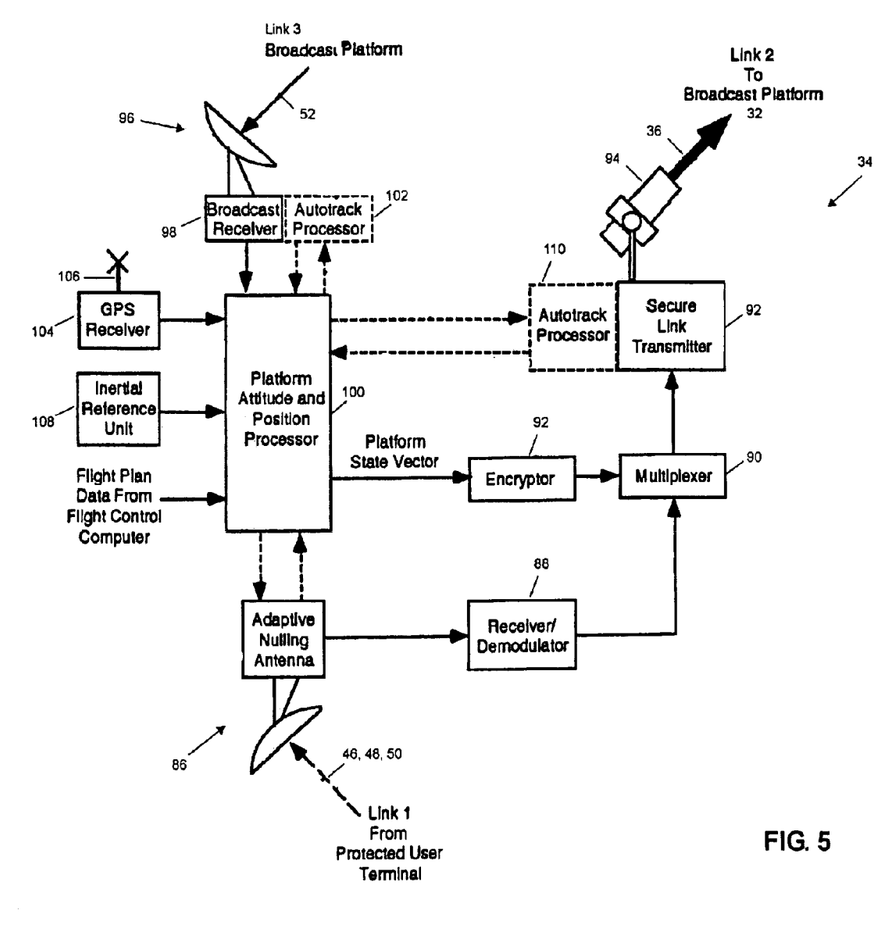
FIG. 5 is a block diagram of the hidden platform in accordance with the present invention.

The hidden platform 34, illustrated in FIG. 5, may be a low observable airborne platform, such as the DarkStar UAV, as well as a fixed or mobile ground based platform. Referring to FIG. 5, uplinks 46, 48 and 50 from the protected terminals 40, 42 and 44 are received by a receive antenna 86. The receive antenna 86 may be an adaptive nulling antenna which provides jamming rejection. The uplink data 46, 48, 50 is applied to a receiver demodulator 88 which decodes the data from the protected terminals 38 and applies it to a multiplexer 90. The position and velocity of the hidden platform 34 is encrypted by a suitable encrypter 92 and applied to the mulitplexer 90. The wideband data from the protected terminals 38 as well as the encrypted position and velocity data for the hidden platform 34 is transmitted to the broadcast platform 32 by way of a secure link transmitter 92, which may be a conventional transmitter, and a transmit antenna 94. The secure link transmitter 92 may apply additional anti-jam techniques, such as spread spectrum frequency hopping to increase the resistance of the uplink 36 to interference and deliberate jamming. The transmit antenna 94 may be, for example, a narrow beam optical telescope or an RF signal to provide a link 36 to the broadcast platform 32. In order to provide better security of the link 36, the wavelength of the link 36 may be selected to be a wavelength with relatively high atmospheric attenuation loss.

The hidden platform 34 also includes a receive antenna 96 for receiving data from the broadcast platform 32. The data from the broadcast platform 32 may include flight plan data from the flight control computer aboard the broadcast platform 32 which can be used in part for steering the uplink transmitter 94 on the hidden platform 34. The signals from the broadcast platform 32 are processed by a broadcast receiver 98 in a conventional manner and applied to a conventional platform attitude and position processor 100. An autotrack processor 102 may optionally be included for steering the antenna 96 as a function of the signal strength of the downlink 52.

A conventional GPS receiver 104 and corresponding GPS antenna 106 may be used to provide the instantaneous coordinates and velocity of the hidden platform 34. The coordinates and velocity data for the hidden platform 34 are applied to the platform attitude and position processor 100 and used to form a platform state vector in a known manner which is encrypted by the encrypter 92 and eventually broadcast by the broadcast platform 32 to all of the protected users 38. During conditions of GPS outages and temporary disturbances, an inertial reference unit 108 may be used to provide temporary position and velocity information. In order to facilitate steering of the transmit antennas 46 of the protected users 38, flight plan data from the flight control computer on board the hidden platform 34 may also be applied to the platform attitude and position processor 100 and incorporated into the platform state vector in a known manner to be broadcast to all of the protected users 38.

An autotrack processor 110 may optionally be provided for steering the uplink antenna 94. In this application a beacon may be provided on the broadcast platform 34 and received along the same path as the uplink 36. The autotrack processor 110 may optionally be used for steering the antenna 94 as a function of the received signal strength of the beacon.

Figure 6:
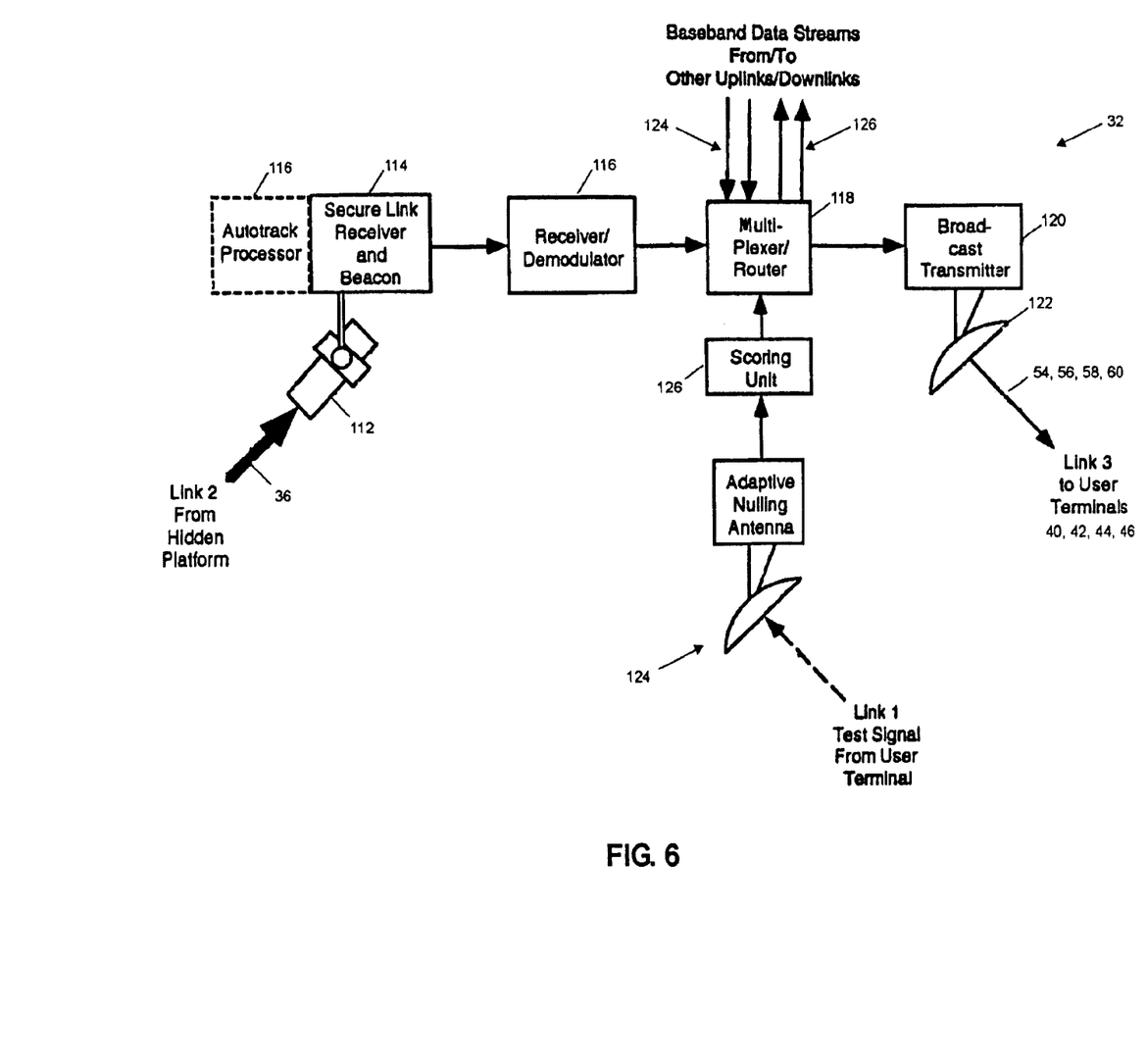
FIG. 6 is a block diagram of the broadcast platform in accordance with the present invention.

A block diagram of the broadcast platform 32 is illustrated in FIG. 6. The uplink from the hidden platform 34, identified by the arrow with the reference numeral 36, is received by a receive antenna 112. As mentioned in connection with the transmit antenna 94 for the hidden platform 34, the receive antenna 112 may be a narrow beam width antenna with low sidelobes. For example, the receive antenna 112 may be a telescope for receiving a narrow beam optical signal and, as mentioned above at a wavelength selected for relatively high atmospheric attenuation loss. The uplink 36 is received by a receiver 114. As mentioned above, a beacon may be provided to transmit signals back to the hidden platform 34 to assist in aiming of the transmit antenna 94 on the hidden platform 34. An autotrack processor 116 may be provided for steering the receive antenna 112 on the broadcast platform 32 as a function of signal strength.

Data contained in the uplink 36 is applied to a receiver/demodulator 116, which, in turn, may be applied to a multiplexer/router 118, for example, and broadcast to the protected terminal 38 by way of a broadcast transmitter 120 and a broadcast antenna 122 with an area coverage beam, earth coverage beam or spot beams. Assuming the broadcast platform 32 has multiple receive and transmit antennas forming a larger communication network, the data from the hidden platform 32 may be multiplexed with other data received from other uplinks and optionally retransmitted on other downlinks as indicated by the arrows 124 and 126.

The broadcast platform 32 may include a calibration channel for enabling the protected terminals 38 to calibrate their transmit antennas 66 before attempting to close the link to the hidden platform 32. Optionally, a receive antenna 124 may be provided with adaptive nulling and spread spectrum waveform processing to increase the system's resistance to jamming. A test signal from the protected terminal 38 is applied to a scoring unit 126 which records the received signal strength as a function of time. The scoring unit signal forms a calibration signal which is then broadcast by way of the transmitter 120 and transmit antenna 122 to a user 38 whose antenna pattern is being calibrated. By time-correlating the user antenna scan angle with the output of the scoring unit 126, the user can determine the boresight (peak gain direction) in the antenna coordinate frame.

Obviously, many modifications and variations of the present invention are possible in light of the above teachings. For example, the system in accordance with the present invention may be used to reduce the risk of intentional jamming and incidental self-interference in commercial satellite-based communication systems. Thus, it is to be understood that, within the scope of the appended claims, the invention may be practiced otherwise than as specifically described above.

What is claimed and desired to be secured by Letters Patent of the United States is:

1. A bi-static satellite communication (SATCOM) relay for enabling communications between various communication terminals comprising:
   a hidden platform which includes a receiver and means for enabling communications with said communications terminals for receiving data from said communication terminals and a transmitter and means for transmitting data to a broadcast platform defining an uplink;
   a broadcast platform separated from said hidden platform having a receiver and means for receiving data from said hidden platform and a transmitter and means for transmitting data to said communication terminals; and
   means for determining the position of said hidden platform and means for transmitting said position to said broadcast platform.

2. The bi-static SATCOM relay recited in claim 1, wherein said hidden platform is an airborne platform.

3. The bi-static SATCOM relay as recited in claim 2, wherein said airborne platform is a low observable platform.

4. The bi-static SATCOM relay as recited in claim 1, wherein said hidden platform is a ground based platform.

5. The bi-static communications relay as recited in claim 1, wherein said means for determining the position of said hidden platform is disposed on said hidden platform.

6. The bi-static communication relay as recited in claim 1, wherein said determining means includes means for determining the velocity of said hidden platform.

7. A bi-static satellite communication SATCOM relay, for enabling communications between various communication terminals comprising:
   a hidden platform which includes a receiver and a receive antenna for enabling communications with said communication terminals for receiving data from said communication terminals and a transmitter and a transmit antenna for transmitting data to a broadcast platform defining an uplink; and
   a broadcast platform having a receiver and a receive antenna for receiving data from said hidden platform and a transmitter and a transmit antenna for transmitting data to said communications terminals, wherein said hidden platform includes means for determining the position of said hidden platform defining position data and wherein said hidden platform includes means for encrypting said position data and transmitting said position data to said broadcast platform.

8. A bi-static communication relay as recited in claim 1, wherein said uplink is an optical uplink.

9. The bi-static communication relay as recited in claim 1, wherein said uplink is an RF signal.

10. The bi-static communications relay as cited in claim 1, further including means for utilizing spread spectrum techniques for said uplink to increase its resistance to jamming.

11. A bi-static satellite communication (SATCOM) relay for enabling communications with various communications terminals comprising:
    a hidden receiver platform for receiving data from said communications terminals comprising:
       a receive antenna and a receiver for receiving signals from said communication terminals;
       a demodulator for demodulating said signals received by said receiving antenna defining demodulated signals;
       means for providing a signal representative of the position of said hidden receiver platform defining position signals, means for encrypting said signals defining encrypted signals, a transmitter and a transmit antenna for transmitting said demodulated signals and said encrypted signals to a broadcast platform defining an uplink; and
    a broadcast platform for transmitting downlinks to said communication terminals comprising:
       a receive antenna and receiver and means for receiving signals from said hidden receiver platform; and
       a transmit antenna and transmitter and means for transmitting said signals received from said hidden receiver platform to said communication terminals.

12. The SATCOM relay as recited in claim 11, wherein said hidden receiver platform is a low observable airborne platform.

13. The SATCOM relay as recited in claim 11, wherein said broadcast platform includes a beacon for facilitating alignment of said transmit and receive antennas on said hidden and broadcast platforms, respectively.

14. The SATCOM relay as recited in claim 11, wherein said providing means includes means for providing the attitude of said hidden receiver platform.

15. The SATCOM relay as recited in claim 14, wherein said providing means includes a global positioning system (GPS) receiver and antenna.

16. The SATCOM relay as recited in claim 14, wherein said providing means also includes an inertial unit.

17. The SATCOM relay as recited in claim 11, wherein said broadcast platform includes means to assist said communications terminals in calibrating their transmit antennas.

18. A communications terminal for use with a satellite communication (SATCOM) system which includes a hidden receiver platform and a separate broadcast platform, said broadcast platform adapted to transmit data and positional information regarding said hidden receiver platform to said communications terminal, said hidden receiver platform configured to receive data from said communications terminal and transmit the data to said broadcast platform, the communications terminal comprising:

means for transmitting data to said hidden receiver platform;

means for pointing said transmitting means toward said hidden receiver platform, said pointing means including means for pointing said transmitting means toward said hidden receiver platform as a function of the position data of said hidden receiver platform received from said broadcast platform; and means for receiving data from said broadcast platform.

19. The communications terminal as recited in claim 18, wherein said communications terminal is a mobile terminal.

20. The communications terminal as recited in claim 18, wherein said communications terminal is a transportable terminal.

21. The communications terminal as recited in claim 18, wherein said communications terminal is a fixed terminal.

22. The communications terminal as recited in claim 18, wherein said communications terminal is a receive only terminal.

23. The communications terminal as recited in claim 18, wherein said pointing means includes means for providing signals representative of the position of said communications terminal.

24. The communications terminal as recited in claim 23, wherein said pointing means further includes means for providing signals representative of the attitude of said communications terminal.

25. The communications terminal as recited in claim 23, wherein said pointing means includes an inertial reference unit.

26. The communications terminal as recited in claim 18, wherein said transmitting means includes a transmit antenna and said communications terminal includes means to assist in calibrating its transmit antenna.

27. The bi-static satellite (SATCOM) relay as recited in claim 11, wherein said providing means includes means for providing a signal representative of the velocity of said hidden receiver platform and said encrypted signals also include encrypted velocity signals.

\* \* \* \* \*